(12) United States Patent
Brown et al.

(10) Patent No.: US 8,544,050 B2
(45) Date of Patent: Sep. 24, 2013

(54) RULE-BASED PLAYLIST ENGINE

(75) Inventors: Scott K. Brown, Marietta, GA (US); Allen Tom, Mountain View, CA (US)

(73) Assignee: AOL Inc., Dulles, VA (US)

( * ) Notice: Subject to any disclaimer, the term of this patent is extended or adjusted under 35 U.S.C. 154(b) by 1505 days.

(21) Appl. No.: 11/619,554

(22) Filed: Jan. 3, 2007

(65) Prior Publication Data

US 2007/0174866 A1 Jul. 26, 2007

Related U.S. Application Data

(63) Continuation-in-part of application No. 10/747,675, filed on Dec. 30, 2003, now abandoned.

(60) Provisional application No. 60/745,956, filed on Apr. 28, 2006.

(51) Int. Cl.
*H04N 7/173* (2011.01)

(52) U.S. Cl.
USPC .......................................................... 725/110

(58) Field of Classification Search
USPC .......................................................... 725/110
See application file for complete search history.

(56) References Cited

U.S. PATENT DOCUMENTS

| | | | |
|---|---|---|---|
| 6,119,163 A * | 9/2000 | Monteiro et al. | 709/227 |
| 6,282,653 B1 | 8/2001 | Berstis et al. | |
| 6,834,195 B2 * | 12/2004 | Brandenberg et al. | 455/456.3 |
| 6,951,030 B2 | 9/2005 | Hirai et al. | |
| 2001/0053944 A1 | 12/2001 | Marks et al. | |
| 2002/0083346 A1 | 6/2002 | Rowlands | |
| 2003/0074418 A1 | 4/2003 | Coker | |
| 2003/0112262 A1 | 6/2003 | Adatia et al. | |
| 2003/0198184 A1 | 10/2003 | Huang et al. | |
| 2004/0001087 A1 * | 1/2004 | Warmus et al. | 345/745 |
| 2004/0158860 A1 * | 8/2004 | Crow | 725/46 |

OTHER PUBLICATIONS

'FAQs: Welcome to the Winamp Frequently Asked Questions,' 2003, reprinted on Dec. 9, 2005.

\* cited by examiner

*Primary Examiner* — Chun-Kuan Lee
(74) *Attorney, Agent, or Firm* — Finnegan, Henderson, Farabow, Garrett & Dunner, LLP

(57) ABSTRACT

A client device is enabled to access content by generating a request to access content residing on a host. A rule set associated with a user is accessed that includes one or more rules configured to identify content responsive to a predicted interest of the user. The rule set is used to identify content selections from a library of content selections available on the host. A first address corresponding to a first content selection and a second address for a second content selection identifying are identified from among the identified content selections. The first content selection is accessed from among the identified content selections by establishing a connection to the host at the address identified for the first content selection. In response to receiving a change instruction to change a content selection being rendered, the second content selection is accessed from the identified content selections at the second address.

30 Claims, 10 Drawing Sheets

800A

Click HERE to generate a playlist using the rule set shown below.

USER_NAME1's Rule set for Media Player Application

Play Commercial every 3 songs.
Play 25% country
Play 50% rock
Play 25% news
    10% sports news
    10% business news
    5% national news Country preferences:
    Include content from COUNTRY_ARTIST1
    Favor ROCK_COUNTRY subgenre
    Disfavor COUNTRY_BALLADS
    Do not play COUNTRY_ARTIST2

Rock Preferences:
    Favor ROCK_BALLAD
    Do not play PROFANE_LYRICS
    Favor ROCK_ARTIST1

Commercial Preferences:
    Favor TRUCK_COMMERCIALS
    Disfavor PRODUCT_TYPE_1
    Favor ROCK_COMMERCIALS AND COUNTRY_COMMERCIALS Regional Preferences:
    Include content from LOCAL_STUDIO
    Include content from LOCAL_ARTIST
    Include content related to LOCAL_ITEM

Fig. 8A

RULE-BASED PLAYLIST ENGINE

CROSS-REFERENCE TO RELATED APPLICATIONS

This application claims priority to U.S. Provisional Application No. 60/745,956, filed Apr. 28, 2006, entitled "Playlist Engine," and is a continuation-in-part of U.S. application Ser. No. 10/747,675, filed Dec. 30, 2003, entitled "Event-based playlisting."

TECHNICAL FIELD

This document relates to event processing, and more particularly to media events.

BACKGROUND

The sophistication level of electronic media distribution and administration is increasing rapidly. New devices and techniques are being used to meet the expanding reach of the electronic media and may use communications networks to distribute and/or select content.

SUMMARY

In one general aspect, a client device is enabled to access content by generating a request to access content residing on a host. A rule set associated with a user is accessed that includes one or more rules configured to identify content responsive to a predicted interest of the user. The rule set is used to identify content selections from a library of content selections available on the host. A first address corresponding to a first content selection and a second address for a second content selection identifying are identified from among the identified content selections. The first content selection is accessed from among the identified content selections by establishing a connection to the host at the address identified for the first content selection. In response to receiving a change instruction to change a content selection being rendered, the second content selection is accessed from the identified content selections at the second address.

Implementations may include one or more of the following features. For example, receiving the change instruction may include receiving an indication that the user wishes to stop accessing the first content selection and start accessing the second content selection or receiving an indication that the user has reached or is approaching a conclusion to the first content selection. Accessing the rule set may include receiving a rule set from the host. Accessing the rule set may include receiving user preferences in association with receiving the request to access the content, and generating the rule set based on the user preferences in response to receiving the request to access the content.

Generating the request may include generating the request in response to determining that the user has launched a media player. Using the rule set to identify the identified content selections from the library may include identifying a region or demographic to which the user belongs, referencing a rule that identifies content based on the region or the demographic, and identifying the content selections from the library based on the rule that identifies content based on the region or the demographic.

Using the rule set to identify the identified content selections from the library may include determining a metric used to indicate the user's predicted interest in a particular selection, identifying an order by which the content selections should be identified, and instructing the client to advance through the sequence of content selections using the identified order.

One or more advertisements may be identified using the rule set. The client may be instructed to access the advertisement as one of the content selections as the user advances through the playlist.

The user is enabled to advance from the first selection in a sequence of content selections to the second selection in the sequence of content selections without perceiving an entire portion of the first selection.

In another general aspect, a client is enabled to access hosted content by receiving a request from a client to access content residing on the host. A rule set associated with the user is identified that includes one or more rules configured to identify content responsive to a predicted interest of the user. The rule set is provided to the client, the rule set being configured to be used by a playlist engine on a client to render a sequence of one or more content selections in a playlist. The one or more content selections are loaded to a communications interface at an addressable location so that the client may access a specified content selection in the sequence of content selections by requesting the content selection accessible from the addressable location and the user is enabled to directly access the specified content selection independent of whether a second content selection has been accessed in the sequence of one or more content selections.

Implementations may include one or more of the following features. For example, identifying the rule set may include identifying an ordering rule that establishes an order in which the user advances through the sequence of content selections. Identifying the ordering rule may include using the host to provide a scoring system to the client, the scoring system used to develop an interest metric for a particular content selection, and instructing the client to use the internet metric to establish the order in which the user advances through the sequence of content selections.

Identifying the rule set may include providing, to a first user, the rule set that includes a first demographic of the first user, providing, to a second user, the rule set that includes a second demographic to the second user, enabling the first user to access a first content selection, and enabling the second user to access a second content selection that is different than the first content selection based on differences in the first demographic and the second demographic.

Identifying the rule set also may include using the host to provide the rule set to the client, the rule set being used to identify one or more content selections from the library of content selections, receiving an indication of how the client responds to the content selections identified by the rule set, and updating the rule set based on the indication. Loading the one or more content selections to the communications interface at the addressable location includes may include identifying content selections eligible associated with the rule set and eligible for selection from the library of content selections, and loading only the identified content selections.

Enabling the user to directly access the specified content selection may include enabling the specified content selection to be retrieved in response to receiving a request addressed to a first location and enabling a second selection to be retrieved in response to a request addressed to a second location.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIG. 8A-8C illustrate exemplary user interfaces that may be presented to a user in the media player application.

DETAILED DESCRIPTION

Figure 1:
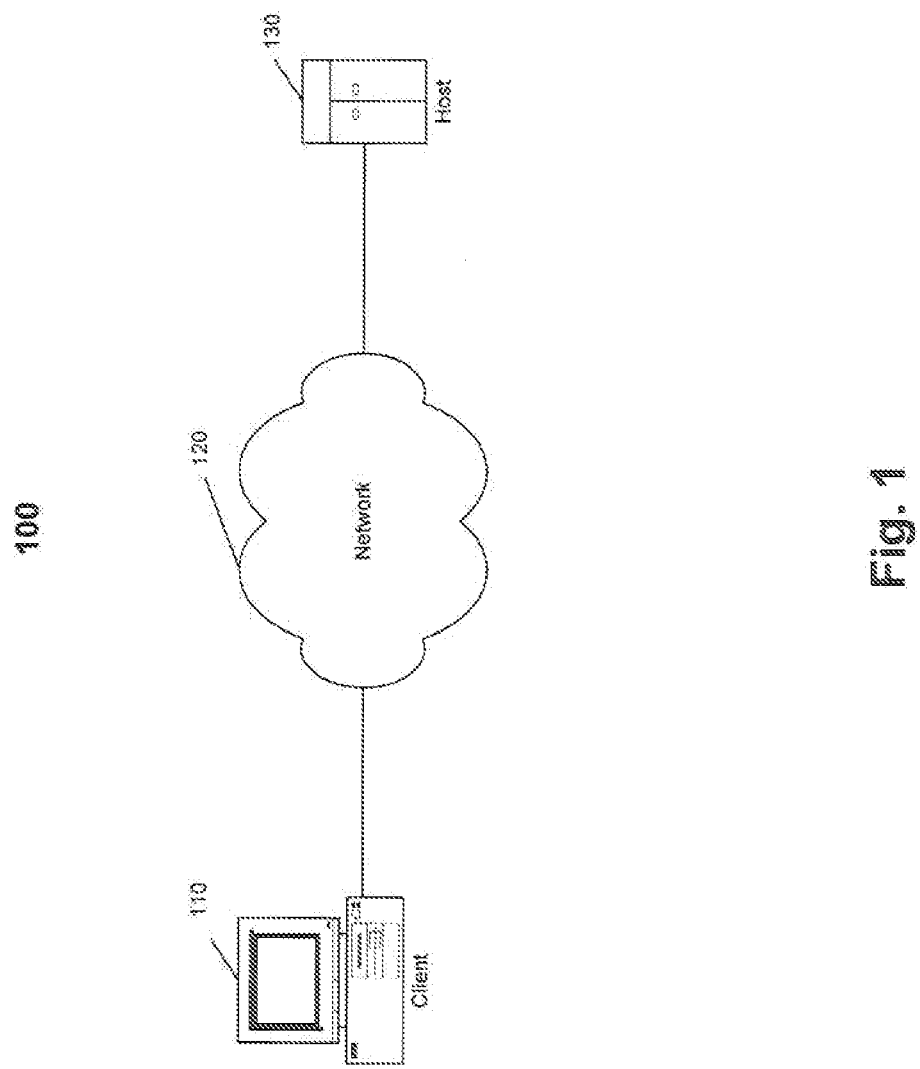
FIG. 1 is a block diagram of a communications system capable of providing a client access to hosted electronic media.

Personalized content can lead to increased user interest of longer duration. The increased user interest and longer duration may be used to realize a number of business objectives for the content provider. For example, with respect to online sources, increasing user interest over a longer duration results in increased consumption of marketing resources, lower customer acquisition costs, greater responsiveness to advertising and greater advertising revenues.

Thus, content providers are behooved to dedicate time and resources attempting to identify or anticipate user interests and to provide content responsive to a user's perceived interests and that may be used in providing. To the extent that user interest is ascertainable or predictable, a content provider may generate a set of rules that reflects a user's interests. Such a set of rules may be used in playlisting engine to retrieve content responsive to the user interests. For example, a content provider may identify that a particular user is more likely to remain connected to an online service (e.g., an Internet Radio station) when the intensity in a sequence of songs varies. As a result, the rule set may be configured to identify content responsiveness to a user's interest. In one implementation, the rules are provided by a host. In another implementation, the rules are created by a user. Still other implementations may include a "suggested" rule set is modified by the user to better identify content responsive to a user's predicted interest.

However, even when rules are configured to support a user's predicted interests, they may include or trigger various playlist attributes that cause a particular user to "disconnect" from a service. For example, a rule set may not account for a particular user's distaste for a disfavored artist or song in an otherwise preferred genre. When the service begins playing content by the disfavored artist or song, the user is increasingly likely to disconnect from the service. In another example, a user's perceived interests may be initially modeled using rules associated with the user's demographic. Because the listening habits of even demographically-related users may differ dramatically when applied to particular content selections (or artists), this approach also may result in rules that include or trigger playlist attributes that result in disconnects.

In one implementation, the user may be able to directly access at least a subset of selections and rules may be employed to identify a selection more likely to be responsive to the user's perceived interest and also advance (e.g., select a "next track" button) through the content selections if the user dislikes the present selection. Thus, a host supporting an Internet Radio service may load multiple songs to be directly accessible through a communications interface, for example, by enabling each of the multiple songs to be provided in response receiving a request on a specified URL ("Uniform Resource Locator") address that is associated with each song. A playlist engine on a client device uses the rules to identify a particular content selection. The playlisting engine then instructs a media player on the client to retrieve the particular content selection at the specified URL. If the user dislikes the identified content selection and selects a "next track" button, the playlisting engine may use the rules to identify a second content selection determined to be responsive to a user's perceived interest. The playlisting engine then may instruct the client to access an URL associated with the second content selection that is different than the URL associated with the first content selection.

As a result, a client may be configured to generate a playlist based on a rule set. More precisely, the rule set (with one or more rules) is used to identify content responsive to a predicted interest of the user. For example, a user may reference a rule set that is used to generate a personalized Internet Radio Station. A playlist engine may use the rule set and generate a sequence of songs and advertisements for the user to listen to. In generating the sequence, the user may access location information for each of the selections so that the client may independently access selections in the sequence. For example, a user may advance from a first advertisement to a second advertisement by generating a request for the second advertisement from a second location.

For instance, a host receives a user request to access a stream of content. For example, a user may launch a media player and select a theme for a personalized radio station (e.g., classic rock). Selecting the theme for the personalized radio station generates a message configured to retrieve the rule set. The host identifies a rule set for the user that includes one or more rules. The rule set may indicate that the user prefers classic rock from the 1970s to classic rock from other eras, indicate favored artists, and/or demographic information (e.g., age, gender and geographic region), and include other information (e.g., a preference for brand names or a description of purchase history). In anticipation of the rule set being used to generate a playlist with a sequence of one or more content selections, the host loads the selections to a communications interface and enables the user to directly access at least a subset of selections so that access to a first selection is not based on access to a second selection in the sequence of one or more selections. For example, a host may permit the user to listen to a second song in a playlist even though the user did not access or listen to the first song in the playlist. In one instance, the user may have elected to advanced forward through a playlist (or sequence) of songs to find a title of interest. In another instance, the user may have listened to a portion of a song, and, not deeming the remainder of the song worthy of the user's interest, selected a "next track" control on a media player.

The host provides the rule set to the client that is configured to interface with a localized playlist engine (e.g., within a media player application on the client) that plays a sequence of one or more selections. The localized playlist engine then loads the rule set, and uses the rule set to generate a playlist that includes a sequence of one or more selections. Once generated, the playlist identifies a first selection to be rendered, and a first location on a providing system at which the first selection may be accessed. The client then accesses the first selection. As the user advances to a next selection in the playlist, the client accesses a second selection from a second location that is different than the first location. For example, a client receiving the rule set may "calculate" a playlist. The client then may render a list of songs for the user to perceive and begin rendering the songs. A user perceiving the list of songs may navigate the playlist by "skipping" undesirable songs, repeating desirable songs, and/or revising the order. User manipulation of the playlist then may be recorded and set back to the host, which updates the rule set in response.

In this scenario, prior to assembling of the content within a content arrangement, the user may perceive rules to be used by an engine in creating a list of content items within such an arrangement or a list that is produced from such rules, and/or attributes of such an arrangement or items thereon. The user may leverage their information to affect resultant content arrangements by, e.g., changing the rules (e.g., adding or removing criteria or logic), and/or changing the content items on a displayed list (e.g., adding or removing or rearranging songs on a list of songs reflective of content arrangement to be formal). And, after assembling the content within a content arrangement, the user may perceive content within the arrangement while concurrently adjusting or arranging the list, e.g., by revising the rule set used to generate the content arrangement.

FIG. 1 illustrates a communications system 100 enabling a client to access electronic media. The media-based communications system 100 includes a client 110, a network 120, and a host 130. Although the communications system 100 is shown as a network-based system, the system may access media files residing in a standalone device or in a different configuration. For example, a mobile jukebox may play content in the form of music encoded in a media file format.

Each of the client 110 and the host 130 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 110 may be configured to receive instructions from, for example, a software application, a program, a piece of code, a device, a computer, a computer system, or a combination thereof, which independently or collectively direct operations, as described herein. The instructions may be embedded permanently or temporarily in any type of machine, component, equipment, storage medium, or propagated signal that is capable of being delivered to the client 110 or the host 130.

The client 110 may include one or more devices capable of accessing content on the host 130. The host client 110 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more informational retrieval software applications (e.g., a browser, a mail application, an instant messaging client, an Internet service provider client, a media player, or an AOL TV or other integrated client) capable of retrieving one or more data units. The information retrieval applications may run on a general-purpose operating system and a hardware platform that includes a general-purpose processor and specialized hardware for graphics, communications and/or other capabilities.

In another implementation, the client 110 may include a wireless telephone running a micro-browser application on a reduced operating system with general purpose and specialized hardware capable of operating in mobile environments.

The client 110 may include one or more media applications. For example, the client 110 may include a software application that enables the client 110 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite. In another example, the controls may enable the user to rewind or fast-forward a received media stream. For example, if a user does not care for a track on a particular station, the user may interface with a "next track" control that will queue up another track (e.g., another song).

The network 120 may include hardware and/or software capable of enabling direct or indirect communications between the client 110 and the host 130. As such, the network 120 may include a direct link between the client and the host, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

Generally, the host 130 includes one or more devices configured to distribute digital content. For instance, a host 130 typically includes a collection or library of content for distribution. Alternatively, or in addition, the host 130 may convert a media source (e.g., a video or audio feed) into a first feed of data units for transmission across the network 120. The host 130 also may include an input/output (I/O) device (e.g., video and audio input and conversion capability), and peripheral equipment such as a communications card or device (e.g., a modem or a network adapter) for exchanging data with the network 120.

The host 130 may include a general-purpose computer having a central processor unit (CPU), and memory/storage devices that store data and various programs such as an operating system and one or more application programs. Other examples of a content source 110 include a workstation, a server, a special purpose device or component, a broadcast system, other equipment, or some combination thereof capable of responding to and executing instructions in a defined manner.

The host 130 may include playlisting software configured to manage the distribution of content. The playlisting software organizes or enables access to content by a user community. For example, the host 130 may be operated by an Internet radio station that is supporting a user community by streaming an audio signal, and may arrange a sequence of songs accessed by the user community.

Figure 2:
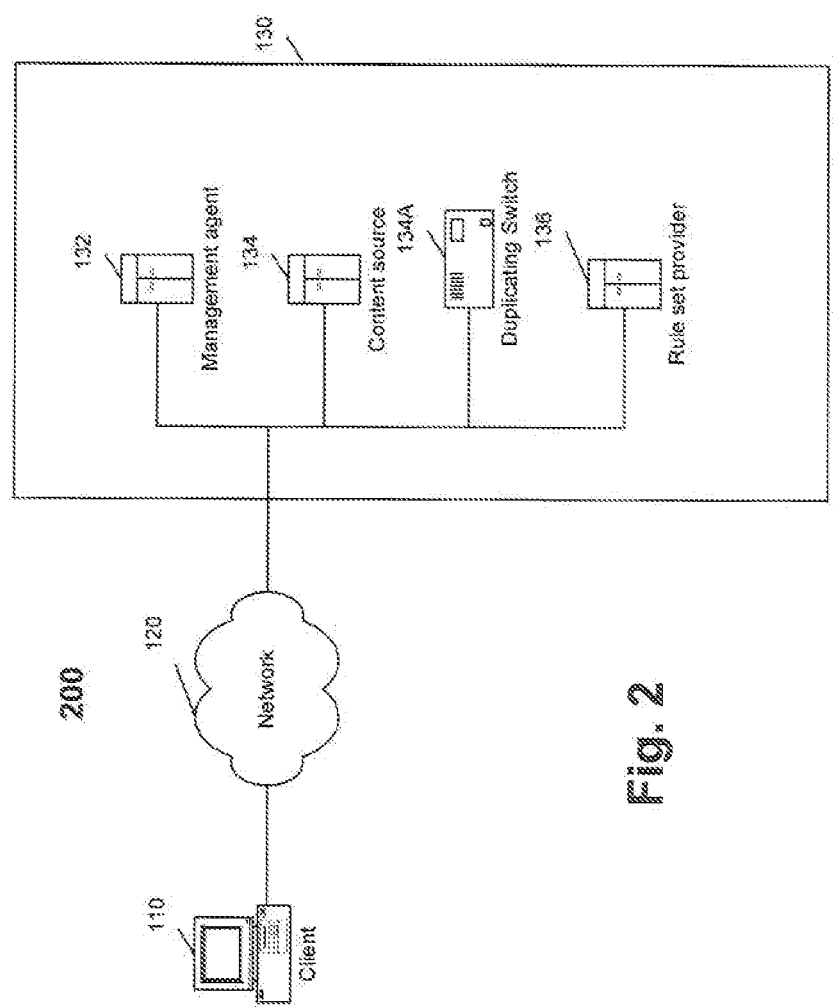
FIG. 2 is a block diagram of a communications system that illustrates an implementation of a host configuration that enables client access to electronic media.

Referring to FIG. 2, a communications system 200 is shown that enables a client 110 to access electronic media, and process the first track in accordance with the downloaded rule set. For convenience, particular components and messaging formats described earlier are referenced as performing the process. However, similar methodologies may be applied in other implementations where different components are used to define the structure of the system, or where the functionality is distributed differently among the components shown.

Generally, the client 110 and the network 120 relate to the client 110 and the network 120 described previously in FIG. 1. Thus, the client 110 may include a personal computer accessing the Internet to access the host 130.

The host 130 generally include systems enabling a client to access a first track of content, download a rule set that includes an event definition and an event transition, detect that the event in the rule set has occurred, and access a second track in response to detecting the event. As shown in FIG. 2, the host 130 includes a management agent 132, a content source 134, a duplicating switch 134A and a rule set provider 136.

Generally, the management agent 132 includes one or more devices configured to provider user and security services for the host 130. In one implementation, the management agent 132 is configured to set client permissions and access rights. Thus, a client 110 wishing to access an Internet-radio station may be initially authenticated using the management agent 132. The management agent 132 then may correlate an identifier for a user of the client (e.g., a screen name) and identify which services the client is allowed to access. For example, a client 110 may be allowed to access basic Internet radio stations that are encoded at a lower quality bit rate, and not be allowed to access premium stations that are encoded at a higher bit rate.

The management agent 132 may selectively enable access to content by providing the list of one or more content sources (e.g., content source 134) after the client 110 has been authenticated and/or by setting permissions on the content source 132 after the client 110 has been authenticated.

Generally, the content source 134 includes a system configured to provide one or more tracks of content to the client 110. For example, the content source 134 may include a server running streaming server software that responds to streaming requests sent from clients. The content source 134 may be configured to provide multiple tracks of content within a stream that is transmitted to the client 110. For example, an Internet radio station may transmit a sequence of songs to a client as part of transmitting an IP ("Internet Protocol") stream.

The content source 134 need not arrange the tracks. For example, the content source 134 may be configured to enable access to a track requested by a user. Thus, the client 110 may be configured to arrange a playlist, and request one or more tracks as required.

The content source may include a duplicating switch 134A. Generally, a duplicating switch 134A includes a device that performs network operations and functions in hardware (e.g., in a chip or part of chip). In some implementations, the duplicating switch 134A may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP address of the received packet, and filtering based on the IP address by implementing a logical gate structure in silicon.

Implementations of the device included in the duplicating switch may employ a Field Programmable Gate Array (FPGA). A FPGA is generally defined as including a chip or chips fabricated to allow a third party designer may load a FPGA with a design to replace the received IP addresses with different IP addresses, or may load the FPGA with a design to segment and reassemble IP packets as they are modified while being transmitted through different networks.

Implementations of the device included in the duplicating switch also may employ a network processor. A network processor is generally defined to include a chip or chips that allow software to specify which network operations will be performed. A network processor may perform a variety of operations. One example of a network processor may include several interconnected RISC ("Reduced Instruction Set Computer") processors fabricated in a network processor chip. The network processor chip may implement software to change an IP address of an IP packet on some of the RISC processors. Other RISC processors in the network processor may implement software that monitors which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same operations.

The duplicating switch 134A may include an event circuit configured to determine whether an event described by an event definition has occurred. For example, the duplicating switch may include an SNMP (Simple Network Management Protocol) collection agent that monitors a network state. The event circuit may analyze the network state and determine whether one or more events have occurred for one or more clients. When the event has occurred, the event circuit may generate a message or modify a stream of data units transmitted to the client indicating that the event has occurred. For example, the event circuit may be configured to modify IP packets transmitted to the client indicating that network utilization is excessive. In response to receiving an IP packet so modified, the client may indicate an event transition for the event. For example, the client may use a lower bit rate or an alternate content source.

The rule set provider 136 includes a system configured to provide a rule set to a client 110. For example, when a client 110 is authenticated (e.g., using management agent 132), the client 110 may receive a rule set that is pushed from the rule set provider 136 in response to a message received from the management agent 132. Alternatively, the rule set provider 136 may be configured to receive requests from the client 110.

Generally, a rule set includes an event definition and an event transition. The event definition describes an event that may occur during a current media state, that is, while a first track is being accessed. In one example, the event definition describes a network condition or failure. Other examples of events described in an event definition may include, but are not limited to, content rules, licensing rules, and client rules. Generally, a content rule describes an event related to the underlying content in the track being accessed. The licensing rules may regulate how a track is accessed relative to other related tracks. For example, the licensing rules may preclude the same song or artist from being played back-to-back or in a specified frequency within a specified period of time. Thus, a media player application may be controlled so that the media player application does not cause adverse performance for other applications on the client 110.

Figure 3:
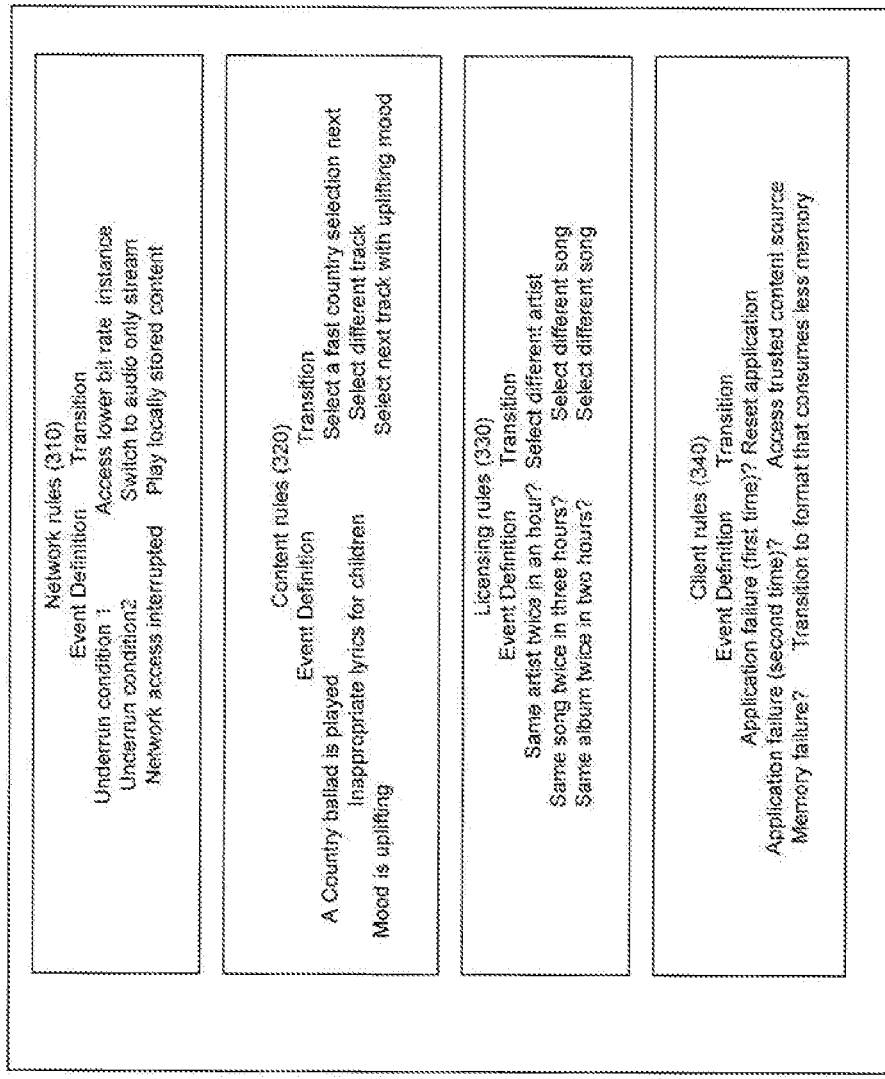
FIG. 3 illustrates a rule set that may be employed to regulate client access to hosted electronic media.

Referring to FIG. 3, an exemplary rule set 300 is shown. For convenience, particular components and messaging formats described earlier are referenced as performing the process. However, similar methodologies may be applied in other implementations where different components are used to define the structure of the system, or where the functionality is distributed differently among the components shown.

The rule set 300 includes network rules 310, content rules 320, licensing rules 330, and client rules 340. Generally, the network rules 310 includes event definitions that describe one or more events relating to network conditions that may adversely impact a client's ability to access a track. As shown, the network rules 310 include event definitions for underrun condition 1, underrun condition 2, and for when network access interrupted. The network rules 310 include corresponding transitions to use a lower bit rate when underrun condition 1 occurs, switch to an audio only version when underrun condition 2 occurs, and play locally stored content when network access is interrupted.

For example, underrun condition 1 may correspond to a minor intermittent failure condition that occurs in receiving a track. Such a condition may result from operating a communications link, such as a dial up link, near maximum capacity. The rule set may instruct the client 110 to access a lower bit rate stream, for example, by accessing a twenty kilobits-per-second stream instead of a forty kilobit per second stream. The underrun condition 2 may correspond to a more severe condition. For example, the client 110 may be receiving a video stream that has an unsupportable bandwidth requirement. As a result, the rule set may instruct the client 110 to receive an audio-only version of the track that consumes less bandwidth. Finally, access to the client 110 network may be interrupted. In response to interrupted network access, the rule set may instruct the client 110 to play locally stored content.

The content rules 320 generally instruct a client 110 how to operate using event definitions and transitions related to the content being accessed. For example, if a country ballad (a slower selection) is being played, a "fast country" selection may be played next. Similarly, if the song included in lyrics that are inappropriate for children is being played, the next track may be selected. Finally, the rule set may relate to a mood-based playlisting system, where tracks are accessed to create and/or preserve a specified mood. Accordingly, if the mood for a current track is uplifting, the next track accessed may be selected so that the uplifting mood is preserved.

The licensing rules 330 relate to licensing restrictions associated with being granted permission to use and distribute one or more forms of electronic media. Thus, if a track associated with an artist is played twice an hour, or in the same track is selected twice within three hours, or an album is accessed twice in two hours, the rule set may provide a transition that instructs the client to access a different track of content that complies with the licensing rules.

The client rules 340 include event definitions and transitions configured to operate the client in a specified operating range. For example, the rule set may be structured to control a media player so that it does not adversely impact other user applications on the client 110. In the example shown, the client rules 340 include an event definition for an application failure (first time), an application failure (second time), and a memory failure. In response to these events, the application may be reset (when there was a first time application failure), a trusted content source may be accessed (when there was a second time application failure), or the client may transition to a format that uses less memory (when there was a memory failure). Specifically, for example, the application may be reset to eliminate an abnormal condition that was introduced, or trusted content source may be accessed to avoid errors that may be introduced by a particular content source or format. Thus, the rule set may instruct a media player to use a content source operated by a service provider instead of continuing to use a content source operated by a third party. Similarly, the rule set may instruct the media player to use a more widely adopted format, rather than use a newly released format.

Moreover, the client rules 340 may instruct the client 110 to use a different format that uses less memory. For example, the client rules 340 may instruct the client 110 to use a more efficient compression algorithm. Using the more efficient compression algorithm may reduce an amount of memory required to store an instance of the first selection.

Figure 4:
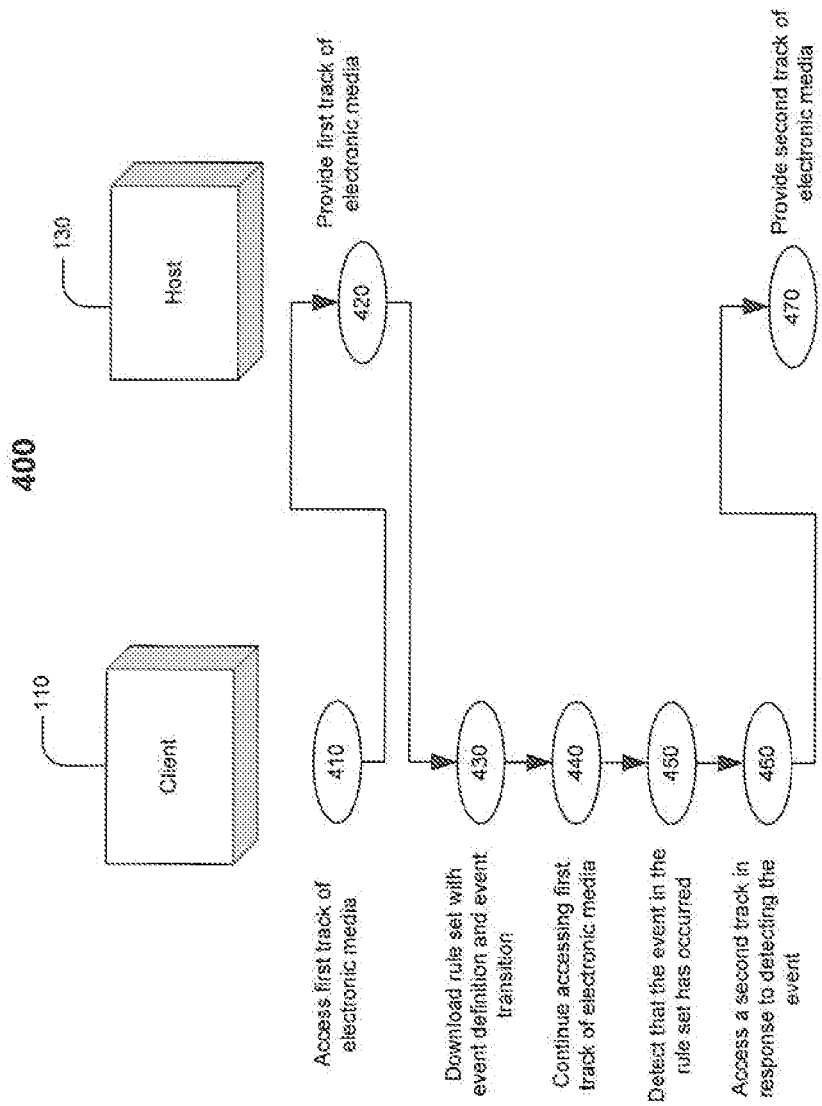
FIG. 4 is a flow chart illustrating a process that may be used by a client in accessing electronic media.

Referring to FIG. 4, a flow chart 400 illustrates an exemplary process by which a client 110 may access electronic media using a rule set to control the client 110. For convenience, particular components and messaging formats described earlier are referenced as performing the process. However, similar methodologies may be applied in other implementations where different components are used to define the structure of the system, or where the functionality is distributed differently among the components shown.

Initially, a client 110 accesses a first track of electronic media (410). For example, a client 110 may receive a stream from a duplicating switch enabling access to an Internet Radio station. Accessing a first track may not include actually playing or generating output using the first track. Rather, accessing the first track of content may include receiving a playlist of digitally encoded audio tracks. The playlist may include the actual content to be played, or it may include one or more references to subsequently access content (e.g., a URL to access a song on the Internet).

The host 130 provides access to the first track of electronic media (420). In one example, the host 130 provides access to the first track on a track-by-track basis. Alternatively, the host 130 may enable access to a stream hosted on a duplicating switch, and insert additional tracks in the stream as required.

The client 110 downloads a rule set with an event definition and event transition (430). Accessing a rule set may include retrieving information describing one or more events and transitions relating to how a client 110 responds when one of the events occurs. The rule set may include, but is not limited to, the rules described previously with respect to FIGS. 1-3.

Accessing the rule set may include retrieving the rule set using both in-band and out-of-band information. For example, retrieving the rule set using out-of-band information may include accessing a rule set from a host 130 in a separate download operation than the download operation enabling access to one or more tracks. Alternatively, an in-band rule set may be written to metadata that is included in the track exchanged with the client 110. Thus, the rule set is accessed in the same download operation used to access the track.

The client 110 continues to access the first track (440). For example, the client 110 may "play" the first track, or additional tracks in the playlist. During the first track, or during a subsequent track, the client 110 may determine that an event in the rule set has occurred (450). This may include, for example, determining that a network failure has occurred. In response to detecting the event, the client 110 accesses a second track (460). The host 130 then provides the second track (470).

Figure 5:
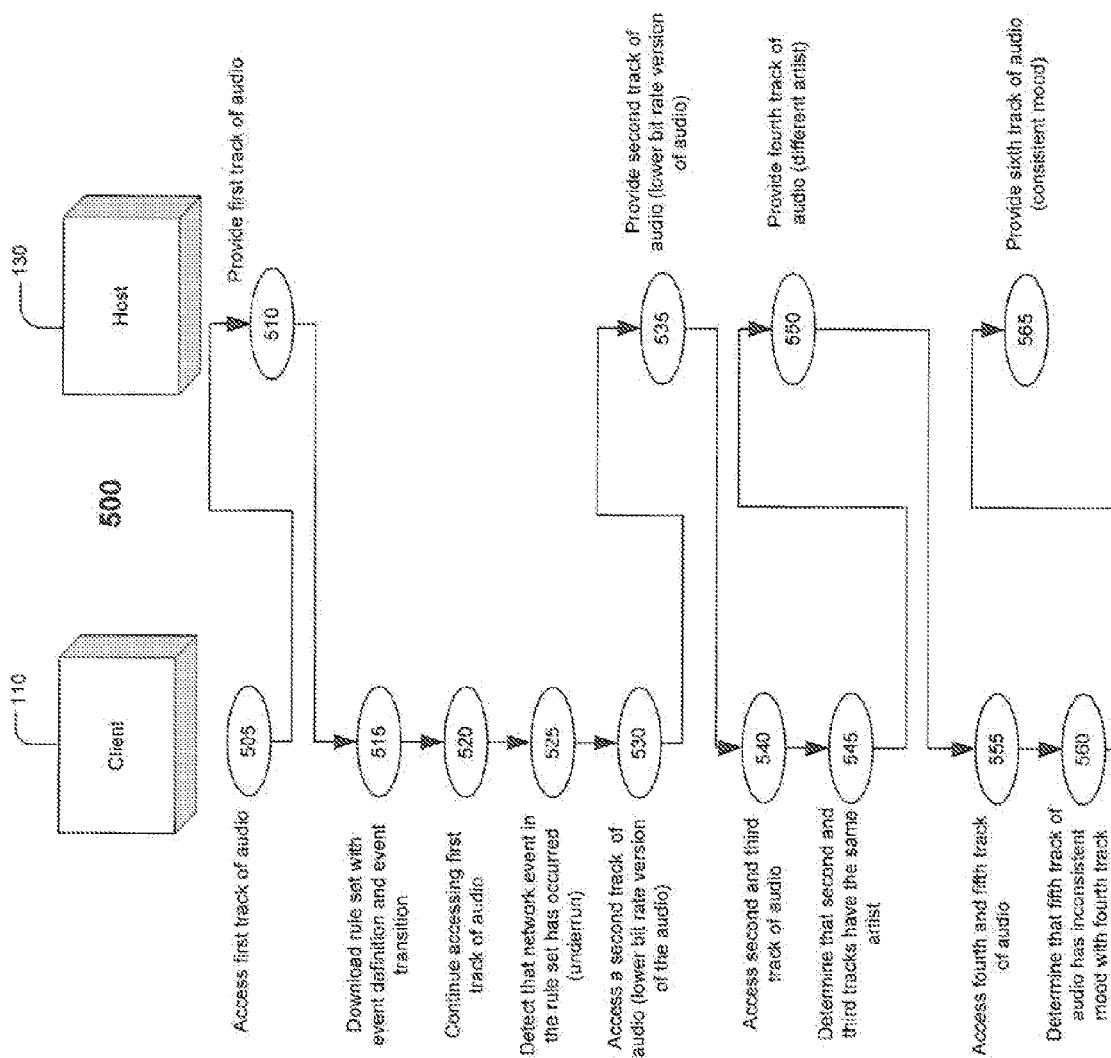
FIG. 5 is a flow chart illustrating a process that may be used by a client in responding to different events that may occur incident to accessing electronic media.

Referring to FIG. 5, a flow chart 500 illustrates an exemplary process by which a host may enable access to electronic media. For convenience, particular components and messaging formats described earlier are referenced as performing the process. However, similar methodologies may be applied in other implementations where different components are used to define the structure of the system, or where the functionality is distributed differently among the components shown.

Initially, the client 110 accesses a first track of audio (505). The host 130 provides the first track of audio (510). The client 110 downloads a rule set that includes an event definition and an event transition (515), and continues to access the first track of audio (520). The client 110 detects that an event described in the event definition has occurred (e.g., a network underrun has occurred) (525). In response, the client 110 accesses a second track of audio, which in this case is a lower bit rate version of the audio track that was selected (530). The host 130 provides a second track of audio (535). The client 110 accesses the second and third track of audio (540). The client 110 determines that the second and third tracks have the same artist, which violates a licensing rule (545). In response, the host 140 provides a fourth track of audio that does not violate the licensing rule (550). The client 110 accesses the fourth and fifth track of audio (555). The client 110 determines that the fourth and fifth tracks of audio have inconsistent moods, violating a client rule provided for by an event definition in the rule set (560). In response and as indicated by the transition associated with the client rule, the client 110 provides a sixth track of audio that provides a consistent mood, which the client accesses (565).

Figure 6:
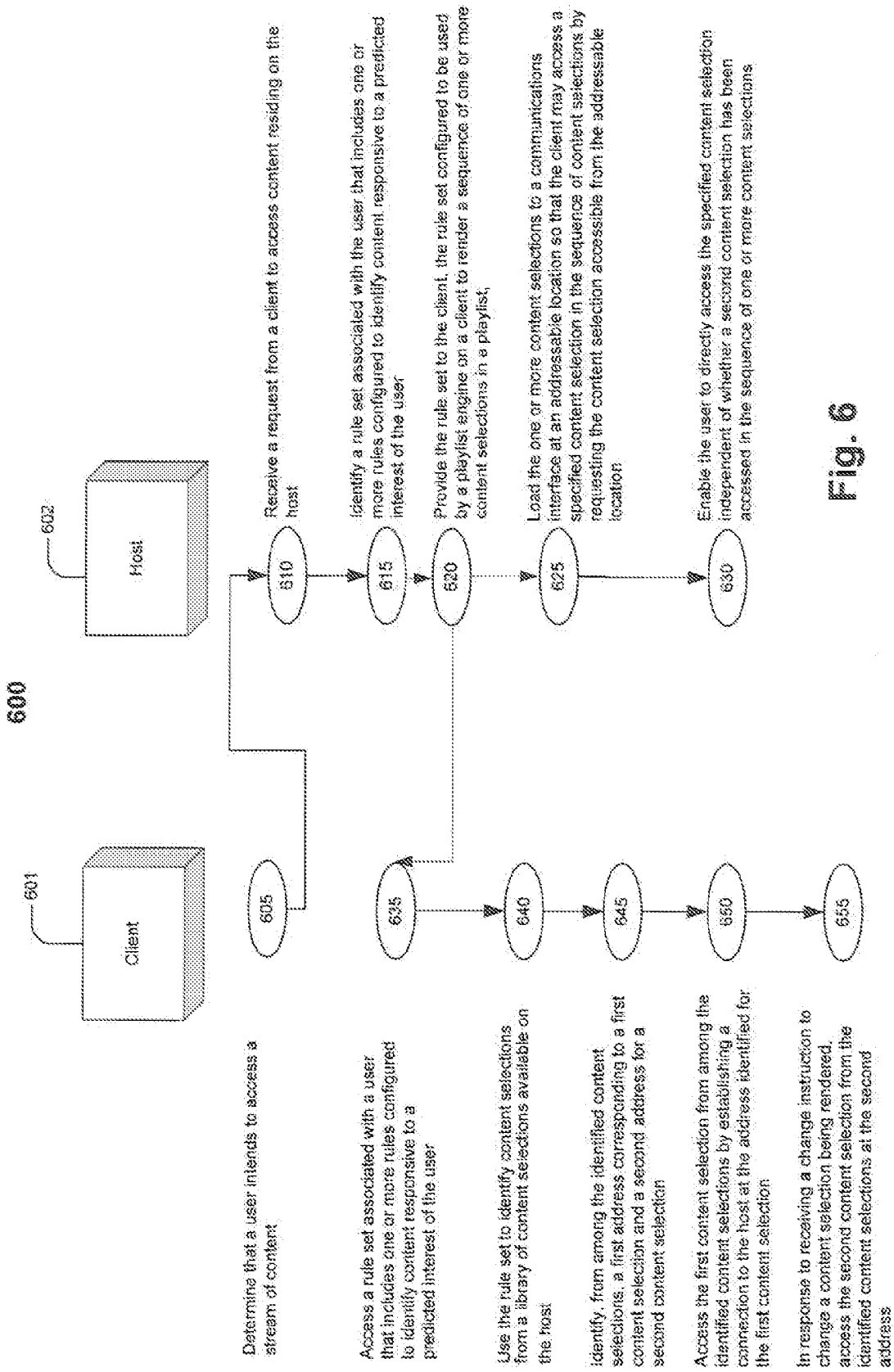
FIG. 6 is a flow chart 600 illustrating an exemplary process by which a user on a client 601 may access content.

Referring to FIG. 6, a flow chart 600 illustrates an exemplary process by which a user on a client 601 may access content. For convenience, particular components and messaging formats described earlier are referenced as performing the process. However, similar methodologies may be applied in other implementations where different components are used to define the structure of the system, or where the functionality is distributed differently among the components shown.

Initially, a client 601 determines that a user intends to access content residing on a host (605). For example, a user on the client 601 may launch a media player. As a result of launching a media player, the host 602 receives a request content residing on the host (610). The host 602 identifies a rule set associated with the user that includes one or more rules configured to identify content responsive to a predicted interest of the user (615). The host 602 provides the rule set to the client 601, the rule set configured to be used by a playlist engine on a client to render a sequence of one or more content selections in a playlist (620). In addition, the host 602 loads the one or more content selections to a communications interface at an addressable location so that the client 601 may access a specified content selection in the sequence of content selections by requesting the content selection accessible from the addressable location (625). The host then enable the user to directly access the specified content selection independent of whether a second content selection has been accessed in the sequence of one or more content selections (630).

In response to receiving the rule set, the client 601 accesses a rule set associated with a user that includes one or more rules configured to identify content responsive to a predicted interest of the user (635). The client 601 uses the rule set to identify content selections from a library of content selections available on the host (640). Specifically, the client 601 uses the playlist to identify, from among the identified content selections, a first address corresponding to a first content selection and a second address for a second content selection (645).

Using the rule set to generate the playlist may represent several different classes of operations and may vary tremendously with the parameters appearing in the rule set. For example, if the rule set identifies a demographic for the user, using the rule set to generate a playlist may include retrieving a list of content selections associated with the demographic. In yet example, a playlist engine may use a parameter descriptive of a demographic and a parameter descriptive of a geographic region to identify a pool of advertisements that reflect likely businesses from the user's geographic region.

Identifying a first selection and a first location may include identifying a sequence of http ("HyperText Transfer Protocol") addresses on a host that the client may access to retrieve the content selections indicated in the playlist. In one implementation, each location represents a unique selection. In another implementation, the location represents a pool of selections that are changed to inject a degree of variation, preserve address space and/or reduce storage requirements on a host.

The client 601 accesses the first content selection from among the identified content selections by establishing a connection to the host at the address identified for the first content selection (650), and in response to receiving a change instruction to change a content selection being rendered, accesses the second content selection from the identified content selections at the second address (655). For example, a media player may include a "next track" button enabling the user to skip a selection such as a song or an advertisement. In another example, the client accesses a second selection after completion of the first selection.

Although the operations described in flow chart 600 were described with respect to an exemplary host, the operations may be performed on other providing systems, such as a duplicating switch.

Figure 7:
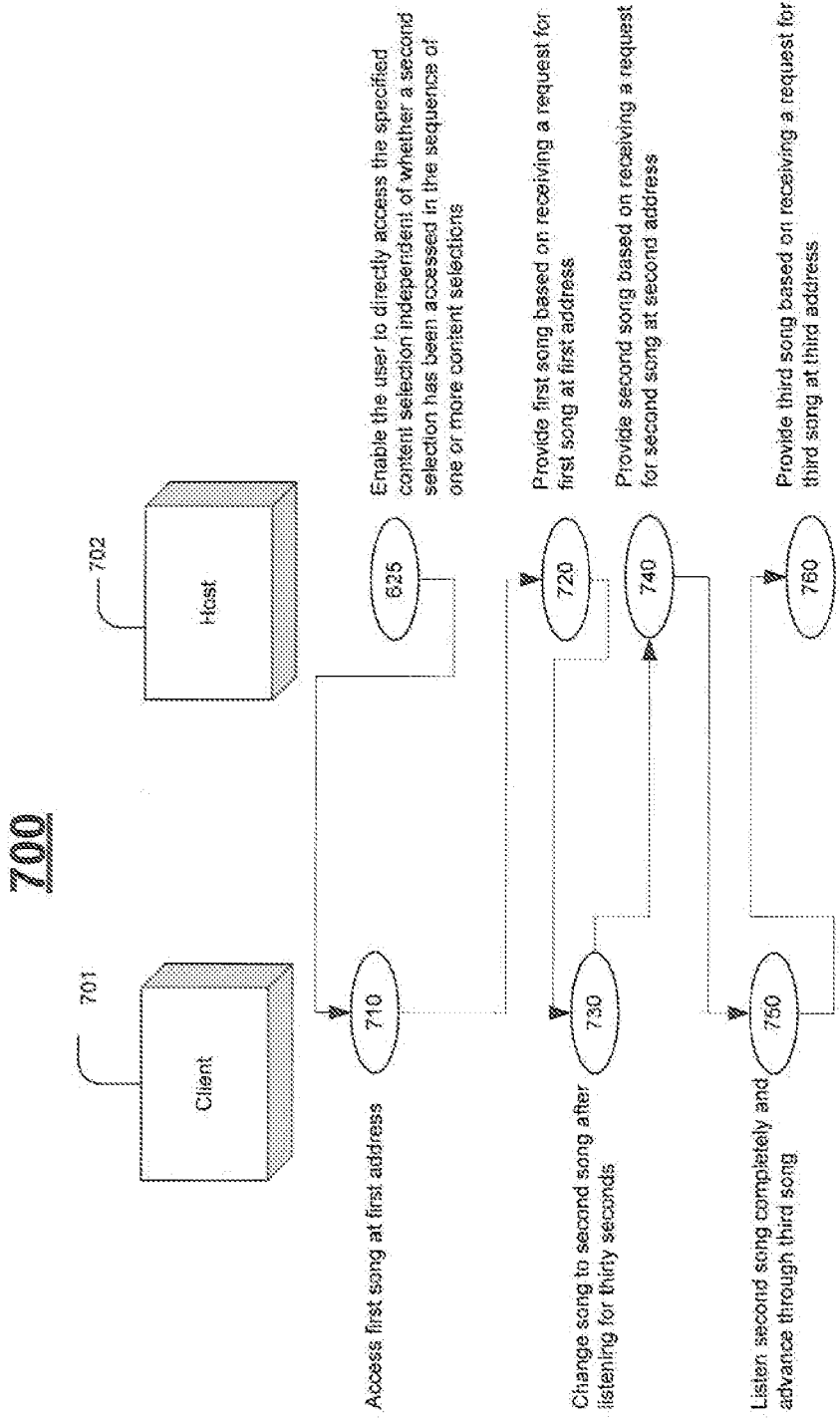
FIG. 7 is a flow chart of a process by which a user advances through a sequence of three songs.

FIG. 7 is a flow chart 700 of a process by which a user advances through a sequence of three songs. Generally, the operations shown in flow chart 700 relate to the systems and processes described previously with respect to FIGS. 1-6. However, flow chart 700 illustrates how a client accesses particular songs at particular addresses in response to a user progressing through a playlist.

Initially, and as was described in operation 625 of FIG. 6, the host 702 enables the user to directly access the specified content selection independent of whether a second selection has been accessed in the sequence of one or more content selections. For example, the host 701 may load songs eligible for identification and selection by a playlist engine (on a client) to different URL addresses on a host.

The client 701 accesses a first song at a first address (710). For example, the client 701 may have received the rule set and evaluated the available songs by developing an interest method for each song. The client then may have developed an ordering for the songs based on the relative interest metrics and accessed the song with the highest interest metric as the first song. Accessing the first song at the first address may include generating an URL request with the first address and transmitting the URL request to the host 702. The host 702 provides the first song based on receiving the request for the first song at the first address (720).

The client 701 then changes the song after listening for thirty seconds (730). For example, the user may have become bored with the song and elected to listen to the next song in the playlist. The client then transmits a request for the second song by sending a request for the second song at a second address (not shown). The host 702 provides the second song based on receiving a request for the second song at the second address (740). The client 701 then receives the second song and listens to the second song completely. The client 701 then advances to the third song (750). More precisely, the client 701 transmits a request for the third song at the third address. The host 702 then provides the third song based on receiving a request for the third song at the third address (760).

Figure 8B:
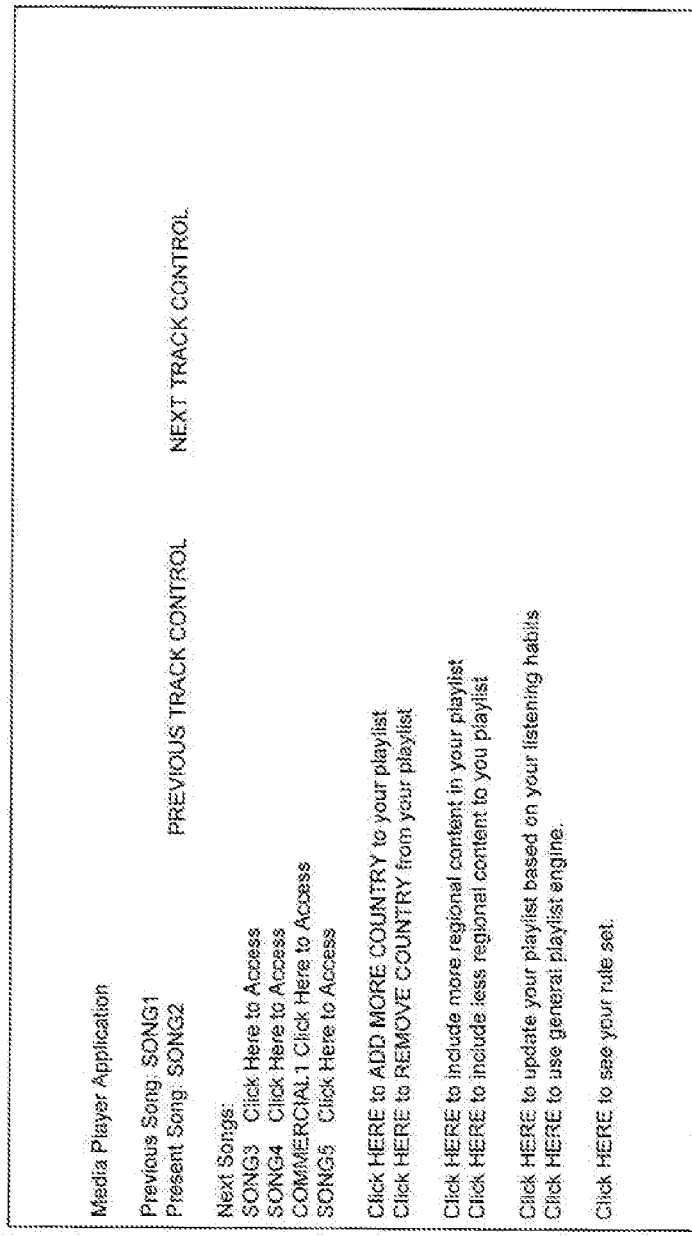
Figure 8C:
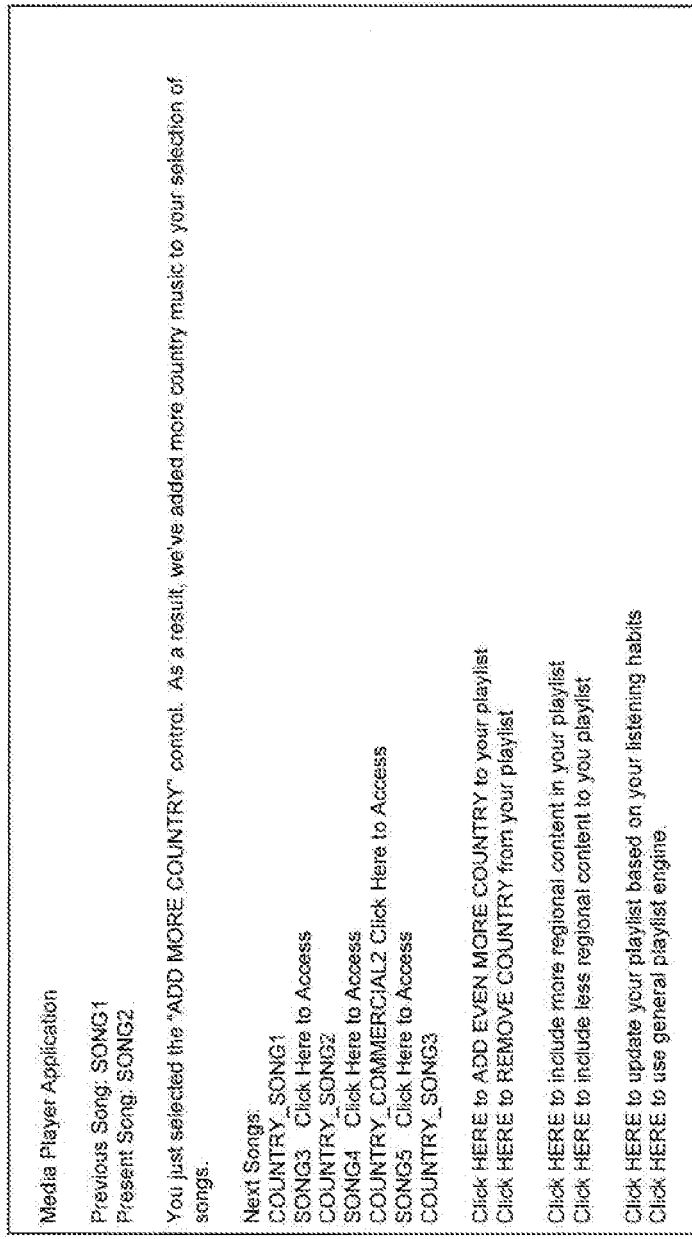

FIGS. 8A-8C illustrate exemplary user interfaces that may be presented to a user in a media player application. FIG. 8A illustrates a UI 800A with a suggested rule set that is presented to a user in order to generate a content arrangement (e.g., playlist). For example, UI 800A may be presented to a users in response to a user launching a media player application. As shown, the user is prompted to confirm use of the rule set below in order to generate a playlist.

As shown, UI 800A indicates that a commercial should played every three songs, and the ratio at which country, rock, and news content should be rendered. Within the 25% allocated to "news", 10% is allocated to business news, and 5% is allocated to national news. In one implementation, the allocation specifies the amount of time over a time window that should be spent on particular subject matter. In another implementation, the allocation specifies the number of selections that should be accessed irrespective of the length of a content selection. A playlist engine may adjust selection of future content selections to account for a lack of precision in a particular time window. In navigating content selections with longer durations that make it more difficult to render a content selection in the specified proportion, the playlist engine may dynamically adjust the settings and/or actual selection of content in order to introduce a degree of variation. For example, if a rock song lasts for an extended period of time at a value that falls just short of the desired threshold proportion, the playlist engine may select another genre (e.g., news) instead of selecting another rock song that would lead to an excess of rock songs while the requirement to renew other genres remains unaddressed.

The different genre preferences indicate that specified artists, subgenres, albums, and/or songs are favored, while other subgenres, artists, and type of content (e.g., PROFANE_LYRICS) are disfavored or forbidden altogether (as indicated by the "do not play" indicator). Commercial preferences indicate that the user favors a certain type of commercials (e.g., truck commercials), disfavors certain products (e.g., PRODUCT_TYPE_1), and favors rock and country music in commercials. The user also has expressed certain regional preferences (as indicated by content from LOCAL_STUDIO), LOCAL_ARTIST, and also LOCAL_ITEM).

In one implementation, the user may interact with UI 800A to change particular rules in the rule set or values within a rule. For example, the user specify the percentage of rock, country, and news that is played. Still, the ability to change other settings may be disabled (e.g., the requirement to play a specified number of commercials may be disabled for non-premium users). Other implementations may include a hybrid of controls where the user cannot change the number of commercials but can configure the type of commercials that are displayed.

Selecting the "Click HERE to generate the playlist" may trigger generation of a playlist as is shown in FIG. 8B. More precisely, FIG. 8B illustrates an exemplary UI 800B enabling a user to perceive a playlist and the rule set used to generate the playlist. UI 800B illustrates that the user is presently accessing a media player application. The user previously accessed SONG1 and is presently accessing SONG2. UI 800 then presents a playlist of songs (SONG3, SONG4, COMMERCIAL1, and SONG5) through which the user is configured to advance either by selecting one of the tracks specifically (or by accessing a "Next Track" control that is not shown) or by listening to each song or commercial in its entirety.

UI 800B also includes controls that enable a user to modify a rule set. For example, the user may click the "ADD MORE COUNTRY" or "REMOVE COUNTRY" control to update the rule accordingly. Similar controls are shown to include more or less regional content. In addition, the user may select an update control to update the playlist (and underlying rule set) based on the user's listening habits. For example, an indication that a user often (or always) avoids a particular artist may be used to revise the rule set so that the artist is not included in future playlists. A privacy control is also included that enables the user to specify that a general playlist (not based on the listening user) should be used.

FIG. 8C illustrates how a playlist is modified as a result of the user selecting controls that modify a playlist. More precisely, UI 800C indicates that the user has just selected the "ADD MORE COUNTRY" control shown in UI 800B. As a result, COUNTRY_SONG1, COUNTRY_COMMERCIAL2, and COUNTRY_SONG3 have been added, and COMMERCIAL1 has been removed. UI 800C also includes controls to "ADD EVEN MORE COUNTRY" in addition to the other rule set controls.

Although UI 800A indicates that the user should confirm use of the rule set before the playlist is generated, in other implementations, a playlist may be automatically generated. For example, a default rule set may be used to generate the playlist. The default rule set may be generic to all users, based on a particular user's demographic, based on monitoring a user's previous use, and/or based on the user's configuration of a rule set during a previous session. The rule set may be rendered after the playlist has been generated in order to allow the user to perceive how a playlist is modified as a result of using a revised rule set.

In one configuration, multiple content selections are concatenated at a particular address on a host. For example, a commercial may be concatenated with a sequence of songs in order to promote increased viewing of advertisements. The media player may include viewing controls that prevent a user from advancing through certain classes of content (e.g., copyright controls and advertisements. Alternatively, the media player may permit a user to advance through different advertisements so long as the media player renders advertisements for a specified duration (e.g., 30 seconds).

Other implementations are within the scope of the following claims. For example, the rule set may reflect projected inventory for advertisements. As a result, the rule set may be modified to realize placement objectives. In one instance, the rule set includes instructions configured to invoke advertisements at a desired rate, invoke advertisements from a specified advertiser, and/or invoke advertisements for a specific product. The rule set may be updated to reflect achievement of desired progress, achievement of specified thresholds, changing objectives and/or purchase by advertisers of advertising opportunities. In one instance, the rule set for a user is updated on a periodic basis. In another instance, the rule set provided by a host is updated during subsequent connections.

In another example, accessing a track need not include outputting the track. A track may be accessed in advance of playing the track. Thus, a user playlist may include metadata that describes the content that will be played in the future using the playlist. The metadata may include URL ("Uniform Resource Locator") information enabling the client 110 to retrieve the track. The metadata also may include lyrics to a song, parental control information, mood-state information, and artist and album information. The metadata may be analyzed using the rule set. Based on the analysis performed, the playlist may be modified to comply with the rule set. Thus, if the analyzing the playlist reveals that licensing restrictions may be violated, the playlist may be modified to comply with applicable licensing rules.

The rule set may include rules personalized to a user, or common across a community of one or more users. The rule set may be used for more than one track, or listening session.

The rule set may be modified or updated over time to reflect changes to the rule set. For example, the host may monitor one or more client activities and provide updates to the rule sets that are responsive to the activities. For example, the host 130 may determine that the client is consistently experiencing the same failure associated with a particular content source. In response, the host 130 may provide the client 110 with one or more alternative content sources and instructions that remove the particular content source associated with the failures from the list of content sources.

The rule set 110 may allow the client 110 to create its own playlist. This may provide a user experience that the user is accessing their own personal radio station. For example, the rule set may include a list of URLs and modifiers enabling the client 110 to retrieve different selections of content. The modifiers may be used to access different tracks on a content source. The client 110 then may assemble a sequence of tracks (some of which may include commercials or advertisements). By processing a sequence of tracks with periodic commercials, local news, and traffic information, the user receives their own personal radio station. The rule set may include one or more personalization tags enabling the client 110 to assemble content responsive to a predicted interest by a user.

The client 110 may update their own rule set. For example, the client 110 may store information describing which tracks the user has accessed. The client 110 may use this stored information to comply with one or more licensing rules.

The rule set may be configured to provide live updates or prioritized content. For example, the rule set may include a notification event where a client may receive notification of prioritized media content or actually receive the prioritized media content when the content becomes available. The rule set may allow a polling agent to poll a host to determine when prioritized content is available. Alternatively, the client may receive a message or learn from the polling agent that prioritized media content is available, which may include a transmission of the Emergency Broadcast System, a current highlight from a favorite sports team or player (e.g., a touchdown run in a football game), or an availability of a user's preferred content (e.g., a live concert with a favorite artist).

In one implementation, the rule set provides an address or location from which the prioritized media content may be made available, or where a polling agent may monitor for updates. In another implementation, the rule set may relate to a client a messaging code segment where the client may receive notifications of live events.

The rule set may include notifications that allow the user to configure which prioritized media content a user elects to receive. For example, a rule set may be configured to provide live transmissions of the Emergency Broadcast System and allow live video updates of a favorite baseball player and football team. The live video updates may be provided automatically, or a user may be notified as to the availability of the live update and select whether to receive the live updates.

The rule set and operations may be distributed across multiple devices. For example, an event defining a first condition (e.g., a network interruption) may be defined on a media player on a client. The client then may download or access an event transition for the first condition (e.g., identifying which content source to access in the event of a network interruption). In another example, the first condition may be defined in a media player, but the parameter describing the network condition (e.g., more than a specified number of underruns) may be downloaded from a host. Still yet another example may include a media player where the event condition resides on a client and a host (e.g., where the media player includes an event for an underrun and the host defines network performance representing an underrun) and the event transition resides on the host.

A host enabling access to content or client software may require a rule set to be in place and/or accessed (e.g., used/downloaded) before the content may be provided or rendered. Thus, a client attempting to access an Internet Radio Station may be required to download a rule set regulating how a stream from the Internet Radio Station is processed.

The rule set operations may be used for other purposes, in addition or to the exclusion of enabling a client to act dynamically. For example, the rule set may be used in a number of different circumstances and environments, such allowing a device to operate in a standalone or static configuration.

Although one or more operations were described as being performed in a particular order and also described with respect to being performed on a client and/or host, the operations may be performed in a different or parallel order and also on a different system. For example, although identifying the eligible and loading the eligible content selections to a host was described as being performed on a host, all or a portion of these operations also may performed using the playlist engine on a client. In one configuration, the host provides a rule set to the client and an indication of which content selections are available in a library. The client then may use the rule set to identify the content selections that should be loaded to a host. The host then may receive the indication of identified content selections and load the identified content selections to an addressable location so that the client may access a particular content selection by referencing a content selection available at the particular address.

Other implementations are within the scope of the following claims. For example, although many of the operations were describes as being performed on a personal computer, the operations also may be performed on other devices, such as a wireless phone. In another implementation, a reconfigurable communications interface is dynamically configured based on the communications configuration that is accessed. For example, a wireless network interface may be configured to operate in different modes and/or bandwidths. Each mode may be associated with a difference performance capability, range, and/or cost. In one example, the communications configuration instructs the client to use a low bandwidth wireless packet mode to exchange instant messages in order to reduce costs while instructing the client to use a high bandwidth mode on the same wireless (and more expensive) for mission critical communications.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications to the specific examples described above also are contemplated.

What is claimed is:

1. A method of enabling a client device to access content, the method comprising:
    generating a request to access content residing on a host;
    accessing a rule set associated with a user that includes one or more rules configured to identify content responsive to a predicted interest of the user;
    using the rule set to identify content selections from a library of content selections available on the host;
    identifying, at the client and based on the identified content selections, at least a first address corresponding to a first content selection and a second address for a second content selection;
    accessing and rendering the first content selection from among the identified content selections;
    receiving a change instruction with respect to the first content selection being rendered, the change instruction including at least one of an indication to change content before a conclusion of rendering the first content selection or an indication to skip one or more identified content selections;
    in response to receiving the change instruction, accessing the second content selection from the identified content selections at the second address; and
    updating the rule set to indicate a user aversion for the first content selection based on the received change instruction.

2. The method of claim 1 wherein receiving the change instruction includes receiving an indication that the user wishes to stop accessing the first content selection and start accessing the second content selection.

3. The method of claim 1 wherein receiving the change instruction includes receiving an indication that the user has reached or is approaching a conclusion to the first content selection.

4. The method of claim 1 wherein accessing the rule set includes retrieving a rule set from the host.

5. The method of claim 1 wherein accessing the rule set includes:
    receiving user preferences in association with receiving the request to access the content; and
    generating the rule set based on the user preferences in response to receiving the request to access the content.

6. The method of claim 1 wherein generating the request includes generating the request in response to determining that the user has launched a media player.

7. The method of claim 1 wherein using the rule set to identify the identified content selections from the library includes:
    identifying a region or demographic to which the user belongs;
    referencing a rule that identifies content based on the region or the demographic; and
    identifying the content selections from the library based on the rule that identifies content based on the region or the demographic.

8. The method of claim 1 wherein using the rule set to identify the identified content selections from the library includes:
    determining a metric used to indicate the user's predicted interest in a particular selection;
    identifying an order by which the content selections should be identified; and
    instructing the client to advance through the sequence of content selections using the identified order.

9. The method of claim 1 further comprising:
    identifying one or more advertisements using the rule set; and
    instructing the client to access the advertisement as one of the content selections as the user advances through the playlist.

10. The method of claim 1 further comprising enabling the user to advance from the first selection in a sequence of content selections to the second selection in the sequence of content selections without perceiving an entire portion of the first selection.

11. A method of enabling a client to access hosted content, the method comprising:
    receiving a request from the client to access content residing on a host;
    identifying a rule set associated with a user that includes one or more rules configured to identify content responsive to a predicted interest of the user;
    providing the rule set to the client, the rule set configured to be used by a playlist engine on the client to render a sequence of one or more content selections in a playlist;
    loading, based on the playlist, the one or more content selections to a communications interface at an addressable location so that the client may access a specified content selection in the sequence of content selections by requesting the specified content selection accessible from the addressable location;
    enabling the user to directly access the specified content selection independent of whether a second content selection has been accessed in the sequence of one or more specified content selections;
    enabling the user to manipulate the sequence of content selections; and
    updating the rule set based on the manipulation, wherein updating the rule set comprises at least revising the rule set to:
        indicate a user aversion to a first content selection in the playlist if the user changes away from the first content selection prior to a conclusion of the first content selection, and indicate a user preference for a second content selection if the user skips at least one of the one or more content selections in the playlist to access the second content selection.

12. The method of claim 11 wherein identifying the rule set includes identifying an ordering rule that establishes an order in which the user advances through the sequence of content selections.

13. The method of claim 12 wherein identifying the ordering rule includes:

using the host to provide a scoring system to the client, the scoring system used to develop an interest metric for a particular content selection; and instructing the client to use the interest metric to establish the order in which the user advances through the sequence of content selections.

14. The method of claim 11 wherein identifying the rule set includes:

providing, to a first user, the rule set that includes a first demographic of the first user;

providing, to a second user, the rule set that includes a second demographic to the second user;

enabling the first user to access a first content selection; and enabling the second user to access a second content selection that is different than the first content selection based on differences in the first demographic and the second demographic.

15. The method of claim 11 wherein identifying the rule set includes:

using the host to provide the rule set to the client, the rule set being used to identify one or more content selections from the library of content selections;

receiving an indication of how the client responds to the content selections identified by the rule set; and updating the rule set based on the indication.

16. The method of claim 11 wherein loading the one or more content selections to the communications interface at the addressable location includes:

identifying content selections eligible associated with the rule set and eligible for selection from the library of content selections; and loading only the identified content selections.

17. The method of claim 11 wherein enabling the user to directly access the specified content selection includes enabling the specified content selection to be retrieved in response to receiving a request addressed to a first location and enabling a second selection to be retrieved in response to a request addressed to a second location.

18. A system that enables a client device to access content, the system including a computer program on a computer readable medium and being structured and arranged to:

generate a request to access content residing on a host;

access a rule set associated with a user that includes one or more rules configured to identify content responsive to a predicted interest of the user;

use the rule set to identify content selections from a library of content selections available on the host;

identify, at the client and based on the identified content selections, at least a first address corresponding to a first content selection and a second address for a second content selection;

access and render the first content selection from among the identified content selections;

receive a change instruction with respect to the first content selection being rendered, the change instruction including at least one of an indication to change content before a conclusion of rendering the first content selection or an indication to skip one or more identified content selections.

in response to receiving the change instruction, accessing the second content selection from the identified content selections at the second address; and updating the rule set to indicate a user aversion for the first content selection based on the received change instruction.

19. The system of claim 18 wherein generating the request includes generating the request in response to determining that the user has launched a media player.

20. The system of claim 18 wherein using the rule set to identify the identified content selections from the library includes:

identifying a region or demographic to which the user belongs;

referencing a rule that identifies content based on the region or the demographic; and identifying the content selections from the library based on the rule that identifies content based on the region or the demographic.

21. The system of claim 18 wherein using the rule set to identify the identified content selections from the library includes:

determining a metric used to indicate the user's predicted interest in a particular selection;

identifying an order by which the content selections should be identified; and instructing the client to advance through the sequence of content selections using the identified order.

22. The system of claim 18 further comprising:

identifying one or more advertisements using the rule set; and instructing the client to access the advertisement as one of the content selections as the user advances through the playlist.

23. The system of claim 18 further comprising enabling the user to advance from the first selection in a sequence of content selections to the second selection in the sequence of content selections without perceiving an entire portion of the first selection.

24. A system that enables a client to access hosted content, the system including a computer program on a computer readable medium and being structured and arranged to:

receive a request from the client to access content residing on a host;

identify a rule set associated with a user that includes one or more rules configured to identify content responsive to a predicted interest of the user;

provide the rule set to the client, the rule set configured to be used by a playlist engine on the client to render a sequence of one or more content selections in a playlist;

load, based on the playlist, the one or more content selections to a communications interface at an addressable location so that the client may access a specified content selection in the sequence of content selections by requesting the specified content selection accessible from the addressable location;

enable the user to directly access the specified content selection independent of whether a second content selection has been accessed in the sequence of one or more content selections;

enable the user to manipulate the sequence of content selections; and update the rule set based on the manipulation, wherein updating the rule set comprises at least revising the rule set to:

indicate a user aversion to a first content selection in the playlist if the user changes away from the first content selection prior to a conclusion of the first content selection, and indicate a user preference for a second content selection if the user skips at least one of the one or more content selections in the playlist to access the second content selection.

25. The system of claim 24 wherein identifying the rule set includes:
   providing, to a first user, the rule set that includes a first demographic of the first user;
   providing, to a second user, the rule set that includes a second demographic to the second user;
   enabling the first user to access a first content selection; and
   enabling the second user to access a second content selection that is different than the first content selection based on differences in the first demographic and the second demographic.

26. The system of claim 24 wherein identifying the rule set includes:
   using the host to provide the rule set to the client, the rule set being used to identify one or more content selections from the library of content selections;
   receiving an indication of how the client responds to the content selections identified by the rule set; and
   updating the rule set based on the indication.

27. The system of claim 24 wherein loading the one or more content selections to the communications interface at the addressable location includes:
   identifying content selections eligible associated with the rule set and eligible for selection from the library of content selections; and
   loading only the identified content selections.

28. The system of claim 24 wherein enabling the user to directly access the specified content selection includes enabling the specified content selection to be retrieved in response to receiving a request addressed to a first location and enabling a second selection to be retrieved in response to a request addressed to a second location.

29. A system that enables a client device to access content, the method comprising:
   means for generating a request to access content residing on a host;
   means for accessing a rule set associated with a user that includes one or more rules configured to identify content responsive to a predicted interest of the user;
   means for using the rule set to identify content selections from a library of content selections available on the host;
   means for identifying, at the client and based on the identified content selections, a first address corresponding to a first content selection and a second address for a second content selection;
   means for accessing and rendering the first content selection from among the identified content selections by establishing a connection to the host at the first address identified for the first content selection;
   means for receiving a change instruction with respect to the first content selection being rendered, the change instruction including at least one of an indication to change content before a conclusion of rendering the first content selection or an indication to skip one or more identified content selections;
   means for, in response to receiving the change instruction, accessing the second content selection from the identified content selections at the second address, and
   means for updating the rule set to indicate a user aversion for the first content selection based on the received change instruction.

30. A system that enables a client to access hosted content, the method comprising:
   means for receiving a request from the client to access content residing on a host;
   means for identifying a rule set associated with a user that includes one or more rules configured to identify content responsive to a predicted interest of the user;
   means for providing the rule set to the client, the rule set configured to be used by a playlist engine on the client to render a sequence of one or more content selections in a playlist;
   means for loading, based on the playlist, the one or more content selections to a communications interface to an addressable location so that the client may access a specified content selection in the sequence of content selections by requesting the specified content selection accessible from the addressable location;
   means for enabling the user to directly access the specified content selection independent of whether a second content selection has been accessed in the sequence of one or more content selections;
   means for enabling the user to manipulate the sequence of content selections; and
   means for updating the rule set based on the manipulation, wherein updating the rule set comprises at least revising the rule set to:
      indicate a user aversion to a first content selection in the playlist if the user changes away from the first content selection prior to a conclusion of the first content selection, and
      indicate a user preference for a second content selection if the user skips at least one of the one of the one or more content selections in the playlist to access the second content selection.

* * * * *

UNITED STATES PATENT AND TRADEMARK OFFICE
CERTIFICATE OF CORRECTION

PATENT NO. : 8,544,050 B2  
APPLICATION NO. : 11/619554  
DATED : September 24, 2013  
INVENTOR(S) : Scott K. Brown and Allen Tom Page 1 of 1

It is certified that error appears in the above-identified patent and that said Letters Patent is hereby corrected as shown below:

In the Claims:

Claim 16, Col. 19, Line 30, "eligible associated" should read as --eligible to be associated--.

Claim 18, Col. 19, Lines 60-61, "selections." should read as --selections;--.

Claim 27, Col. 21, Line 23, "eligible associated" should read as --eligible to be associated--.

Signed and Sealed this
Eighteenth Day of February, 2014

Michelle K. Lee
*Deputy Director of the United States Patent and Trademark Office*